United States Patent
Hartweg et al.

[11] Patent Number: 6,004,520
[45] Date of Patent: Dec. 21, 1999

[54] METHOD FOR OPERATING A PURIFICATION DEVICE, A PURIFICATION DEVICE AND USE OF THE SAME

[75] Inventors: Martin Hartweg, Erbach; Rolf-Dirc Roitzheim, Dornstadt; Andrea Seibold, Blaustein; Leonhard Walz, Rastatt; Thomas Fetzer, Speyer; Bernd Morsbach, Ludwigshafen, all of Germany

[73] Assignee: Daimler-Benz AG, Stuttgart, Germany

[21] Appl. No.: 08/764,461

[22] Filed: Dec. 12, 1996

[30] Foreign Application Priority Data

Dec. 13, 1995 [DE] Germany ............... 195 46 482

[51] Int. Cl.⁶ .................................. B01J 8/02
[52] U.S. Cl. .................. 423/213.2; 423/213.5; 423/239.1
[58] Field of Search ............... 423/212, 213.2, 423/235, 239.1; 422/168, 177, 180; 60/272, 273, 274, 295

[56] References Cited

U.S. PATENT DOCUMENTS

| | | | |
|---|---|---|---|
| 4,613,583 | 9/1986 | Koch et al. ............... | 502/252 |
| 4,707,341 | 11/1987 | Koch et al. ............... | 422/177 |
| 4,912,776 | 3/1990 | Alcorn ............... | 423/239 |
| 5,227,145 | 7/1993 | Kintaichi et al. ............... | 423/239 |
| 5,260,035 | 11/1993 | Lachman et al. ............... | 422/180 |
| 5,645,804 | 7/1997 | Sumiya et al. ............... | 423/239.1 |
| 5,736,114 | 4/1998 | Barthe et al. ............... | 423/213.2 |
| 5,750,460 | 5/1998 | Hartweg et al. ............... | 502/342 |

FOREIGN PATENT DOCUMENTS

| | | |
|---|---|---|
| 0 148 358 | 7/1985 | European Pat. Off. . |
| 0 210 681 A1 | 2/1987 | European Pat. Off. . |
| 0 283 913 | 9/1988 | European Pat. Off. . |
| 0 494 388 | 7/1992 | European Pat. Off. . |
| 0 676 232 | 10/1995 | European Pat. Off. . |
| 94 04 158 | 4/1994 | France . |
| 42 14 183 | 6/1993 | Germany . |
| 44 20 932 | 1/1996 | Germany . |
| 61-37983 | 8/1986 | Japan . |
| 5-237336 | 9/1993 | Japan . |
| 7-100335 | 4/1995 | Japan . |
| 7-251074 | 10/1995 | Japan . |
| 7-284662 | 10/1995 | Japan . |

*Primary Examiner*—Gary P. Straub
*Attorney, Agent, or Firm*—Evenson, McKeown, Edwards & Lenahan P.L.L.C.

[57] ABSTRACT

The present invention relates to a method for operating a purification device, to a purification device and to the use of same. To reduce the emission of pollutants, a filter body through which a fluid can flow and comprising a catalyst, is exposed to a stream of gas which is to be purified. Before the gas enters the catalyst, a reducing agent is added in the flow direction of the gas, and after a certain treatment point, during which the gas, which is to be purified, is flowing in the catalyst, reducing agent is added once more to the flowing gas by a feeding mechanism and contact with the catalyst is maintained.

12 Claims, 3 Drawing Sheets

METHOD FOR OPERATING A PURIFICATION DEVICE, A PURIFICATION DEVICE AND USE OF THE SAME

BACKGROUND AND SUMMARY OF THE INVENTION

The present invention relates to a method for operating a purification device for flowing gases, particularly for exhaust gases of internal combustion engines, wherein the purification device comprises a filter body through which fluids can flow and which comprises a catalyst which is exposed to the gas stream, wherein a reducing agent is added to the gas before the gas enters the catalyst, to a purification device for purifying gases, comprising a filter body which comprises a catalyst and through which fluids can flow, wherein the filter body is disposed in the gas flow, and wherein the filter body purifies the gases with the help of a reducing agent, as well as to the use of such a purification device, wherein such a purification device is useful in automobiles to decrease pollutants.

Published German Patent 44 20 932 discloses a catalyst for a purification device for exhaust gases of a diesel engine which is made of a spinel. The catalyst has a high resistance to substances present in the exhaust gas. However, the reduction of the nitrogen oxides is limited to 40% at most.

It is an object of the present invention to develop a method which lowers the emission of pollution. Furthermore, it is an object of the present invention to provide a purification device which lowers the emission of pollution.

Pursuant to the present invention, these and other objectives are accomplished by a method comprising the steps of adding more reducing agent to the gas after a certain treatment point wherein the gas to be purified has passed through the catalyst of the filter body, and maintaining contact between the gas and the catalyst of the filter body.

These and other objectives are also accomplished by a purification device wherein the purification device comprises a mechanism for feeding reducing agent to the gas as it flows through the filter body.

By adding reducing agent at a point after which the catalyst no longer has any catalytic effect with respect at least one of the pollutants, the reduction of pollutants, particularly of nitrogen oxides, can be increased to more than 40%.

Other objects, advantages and novel features of the present invention will become apparent from the following detailed description of the invention when considered in conjunction with the accompanying drawings.

DETAILED DESCRIPTION OF DRAWINGS

Figure 1:
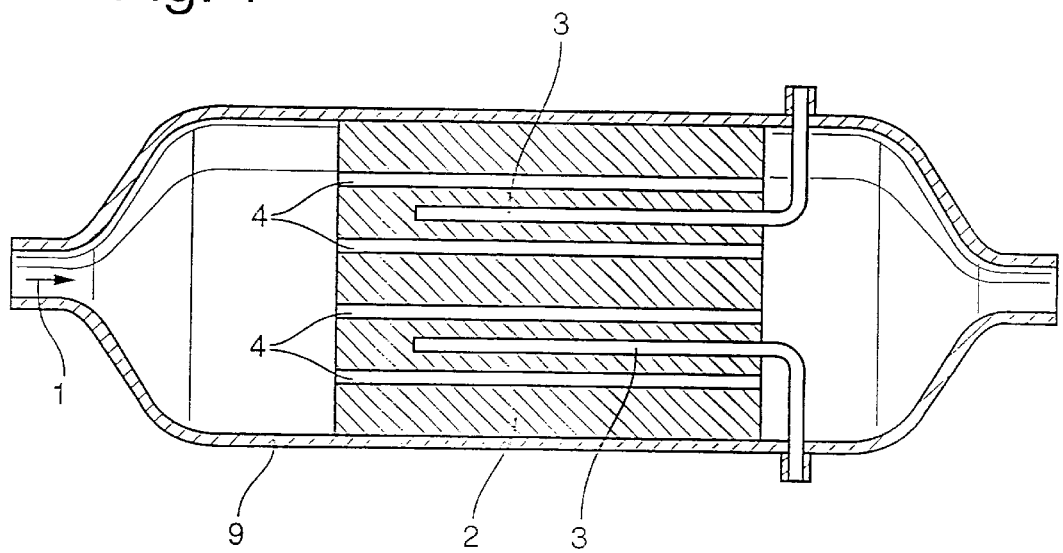
FIG. 1 shows a purification device with a porous filter body comprising the catalyst and with an addition duct for the reducing agent.

FIG. 1 shows a purification device which can be used in the exhaust line 9 of a diesel engine or a gasoline engine operated on a lean mixture, such as a motor vehicle, preferably a passenger car. However, the present invention can also be used, for example, as the purification device for waste gases or flue gases of power plants, or also in the chemical industry as a filter.

The porous filter body 2 has flow ducts 4, through which the exhaust gas, waste or flue gas, which is to be purified, flows and which are depicted here simply as linear ducts.

The exhaust gas, waste or flue gas, flowing through the ducts 4, contains hydrocarbons, which can function as reducing agents for nitrogen oxides ($NO_x$), such as NO and $NO_2$, which are also present in the exhaust gas. However, after a certain treatment point, the hydrocarbons are consumed so that the filter body 2 no longer has any catalytic effect on the pollutants.

In order to further reduce pollutants within the filter body 2 of the purification device, the filter body 2, which comprises the catalyst, has an addition duct 3 of a mechanism for feeding reducing agents between two flow ducts 4. The addition duct 3 is connected with the reservoir of a feeding mechanism, which is not shown. The addition duct 3 is preferably connected with suitable safety measures with the tank venting system of the motor vehicle so that, the vapor space of the tank forms the reservoir.

Viewed in the flow direction 1 of the exhaust gas, the blind addition duct 3 is closed off on the gas inflow side and connected with the reservoir on the gas outflow side. Ammonia and, in motor vehicles, particularly hydrocarbons, have proven to be advantageous reducing agents.

To feed the reducing agent, the reducing agent flows in on the gas outflow side and diffuses through the porous filter body 2, which has capillary action, into the flow ducts 4 and evaporates there. As a result, the concentration of reducing agent is increased in the exhaust gas, which has already been partially purified.

The increase in the concentration of hydrocarbons which takes place within the filter body 2, causes the pollutants which remain in the partially purified exhaust gas to be further reduced during the flow of the exhaust gases through the filter body 2. As a result, the exhaust gas is more completely purified in the purification device on the whole. The concentration of pollutants in the exhaust gas is simultaneously decreased by lowering the concentration of carbon monoxide and/or hydrocarbons.

In order to avoid feeding an excessive amount of reducing agent, the feeding device advantageously may comprise a metering device (not shown), such as a volumetric pump, so that the addition of reducing agent can be accurately measured.

The addition duct 3 can also be extended from the outer periphery of the filter body 2, transversely to the flow direction 1 of the exhaust gas up to the center of the filter body 2. This embodiment, which is not shown, has the advantage that, with a single addition duct 3, several flow ducts 4 can be simultaneously acted upon with reducing agent. Moreover, the advantage here is that the addition duct or ducts 3 can be supplied with the reducing agent in a simple manner from the outer periphery of the filter body 2.

In the case of a porous filter body 2, the feeding mechanism advantageously has nozzles, particularly a nozzle ring 6, which is disposed peripherally in the filter body 2, out of which the reducing agent can flow through the filter body 2, preferably at right angles to the direction 1 of exhaust gas flow. The preferably gaseous reducing agent is transported through the pores of the porous filter body 2 in the direction of the exhaust gas flow.

The reducing agent is advantageously added after a certain treatment point, which corresponds to a saturation point of the filter body 2 at which the filter body 2 no longer has any catalytic effect. The saturation point corresponds to that segment, through which gas is flowing, after which, as seen in the flow direction 1, a decrease in saturation of the pollutants, particularly of the reduction of nitrogen oxide, is seen in the catalyst of the filter body 2.

Figure 2:
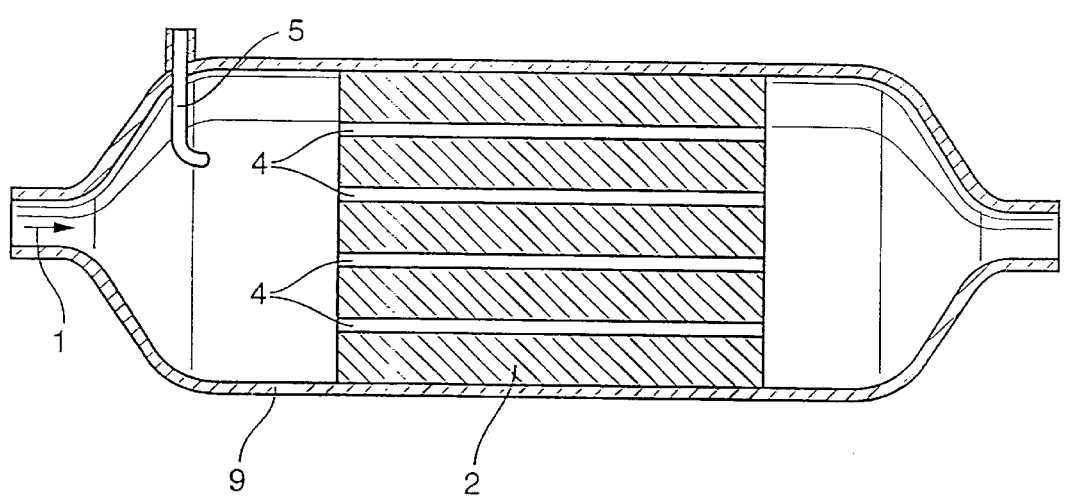
FIG. 2 shows a purification device with a mechanism, disposed upstream of the filter body, to feed the reducing agent.

In FIG. 2, a further purification device is shown, wherein the filter body 2 is disposed in the exhaust line 9 of an internal combustion engine, particularly of a diesel engine or a gasoline engine operated on a lean mixture.

In the embodiment of FIG. 2, the feeding mechanism has an atomizing nozzle 5, which is disposed on the gas inflow side upstream of the filter body 2 through which the exhaust gas flows. The atomizing nozzle 5 is provided to atomize the reducing agent and is dimensioned so that the reducing agent is atomized in droplets of such a size, that a drop is completely vaporized in the filter body 2 only after it has penetrated into the filter body 2, to a certain depth, which preferably corresponds at least to the saturation point. The droplet size can be empirically determined, for example. The renewed addition of reducing agent within the filter body 2 therefore takes place through the evaporation of the drop within the filter body 2.

Figure 3:
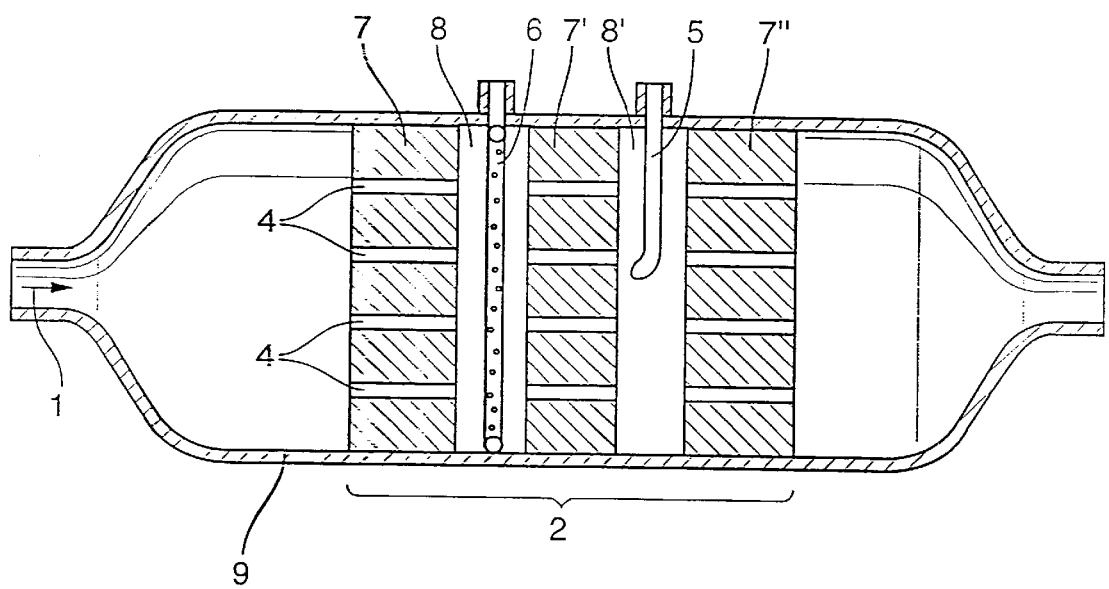
FIG. 3 shows a purification device with a mechanism comprising a nozzle ring to feed the reducing agent.

In FIG. 3, a further embodiment of the purification device is shown. In the embodiment of FIG. 3, the filter body 2 is divided into three segments to form a filter cascade. The filter body segments 7, 7', and 7" of the filter body 2, through which the exhaust gas flows and which are porous, are spatially separated from one another and disposed serially in the flow direction 1 of the exhaust gas. The length of a filter body segment 7, 7', or 7", measured in the flow direction 1, corresponds appropriately to the saturation point of the catalyst of the filter body 2.

In the spaces 8 and 8' disposed between the filter body segments 7, 7' and 7" of the filter body 2, nozzles 5 and 6 are disposed which belong to the feeding mechanism. In the first space 8, a nozzle ring 6 is disposed at the periphery from which the flow proceeds radially inwards. In the second space 8', a centrally disposed atomizing nozzle 5 is disposed. The reducing agent flows into the respective space 8 and 8' and mixes with the already partially purified exhaust gas. The space 8 and 8' can therefore also be regarded as a sort of mixing chamber. The exhaust gas enriched with reducing agent in space 8 or 8', is then supplied to the filter body segment 7' or 7" respectively, in order to further decrease pollutants.

In all the embodiments, the catalyst is preferably a spinel. Spinels are materials of the general chemical formula $A_aB_bO_4$, wherein A is at least one bivalent metal and B is at least one trivalent metals, and $a+b=3$, $a>0$, and $b>0$, and which have, at least microscopically, a crystallographical or crystalline cubic lattice structure with face-centered oxygen ions and tetrahedral and octahedral gaps. The A particles and up to 50% of the B particles are disposed in the tetrahedral gaps and the remaining B particles are disposed in the octahedral gaps. The term A particle and B particle refers here only to the crystallographic arrangement. In the present invention, the substoichiometric compounds in which $B_bO_3$ functions as a matrix and which have characteristic spinel lines in the X-ray spectrum, are also regarded as spinels. The spinel of the composition $A_aB_bO_4$ is present in the $B_bO_3$ matrix, therefore an $A_{a(1-x)}B_bO_4$ stoichiometry results. From a material point of view, the A and B particles can be different from one another.

In the spinel, the A particle comprises at least one element selected from Mg, Ca, Mn, Fe, Ni, Co, Cu, Zn, Sn and Ti and the B particle comprises at least one element selected from Al, Ga, In, Co, Fe, Cr, Mn, Cu, Zn, Sn, Ti and Ni. However, it should be noted that A and B cannot simultaneously represent Mn, Fe or Co.

In one preferred embodiment, the catalyst is a material of the chemical formula $A1_{a1}A2_{a2}B_bO_4$, wherein A1 and A2 independently represent at least one element selected from Mg, Ca, Mn, Fe, Ni, Co, Cu, Zn, Sn and Ti and $a1+a2+b=3$, $a1>0$, $a2>0$, and $b>0$.

In another preferred embodiment, the catalyst is a material of the chemical formula $A1_{a1}A2_{a2}B_2O_4$, wherein A1 and A2 independently represent at least one element selected from Mg, Ca, Mn, Fe, Ni, Co, Cu, Zn, Sn and Ti and $a1+a2=1$, $a1>0$, and $a2>0$.

In a further preferred embodiment, the catalyst is a material of the chemical formula $A1_{0.5}A2_{0.5}B_2O_4$, wherein A1 and A2 independently represent at least one element selected from Mg, Ca, Mn, Fe, Ni, Co, Cu, Zn, Sn and Ti.

The following, spinel-like compositions have proven to be particularly advantageous: $(MgCu)Al_2O_4$, $(CuCu)Al_2O_4$, $(CuZn)Al_2O_4$, $(CoZn)CuAl_2O_4$, mixtures of $(ZnCu)Al_2O_4$ with $WO_3$ and/or $V_2O_5$ and/or $TiO_2$, particularly $Mg_{0.5}Cu_{0.5}Al_2O_4$, $Cu_{0.5}Cu_{0.5}Al_2O_4$, $Cu_{0.5}Zn_{0.5}Al_2O_4$, $Co_{0.25}Zn_{0.25}Cu_{0.5}Al_2O_4$ or their mixtures with 10% $WO_3$ and 3% $V_2O_5$ and/or 84% $TiO_2$ and/or $Al_2O_3$.

Moreover, it has been shown to be advantageous to provide these spinels with catalytically active elements, such as palladium, platinum, rhodium, ruthenium, osmium, iridium, rhenium and/or rare earth metals such as lanthanum and cerium, vanadium, titanium, niobium, molybdenum, tungsten and/or their salts and/or their oxides.

Figure 4:
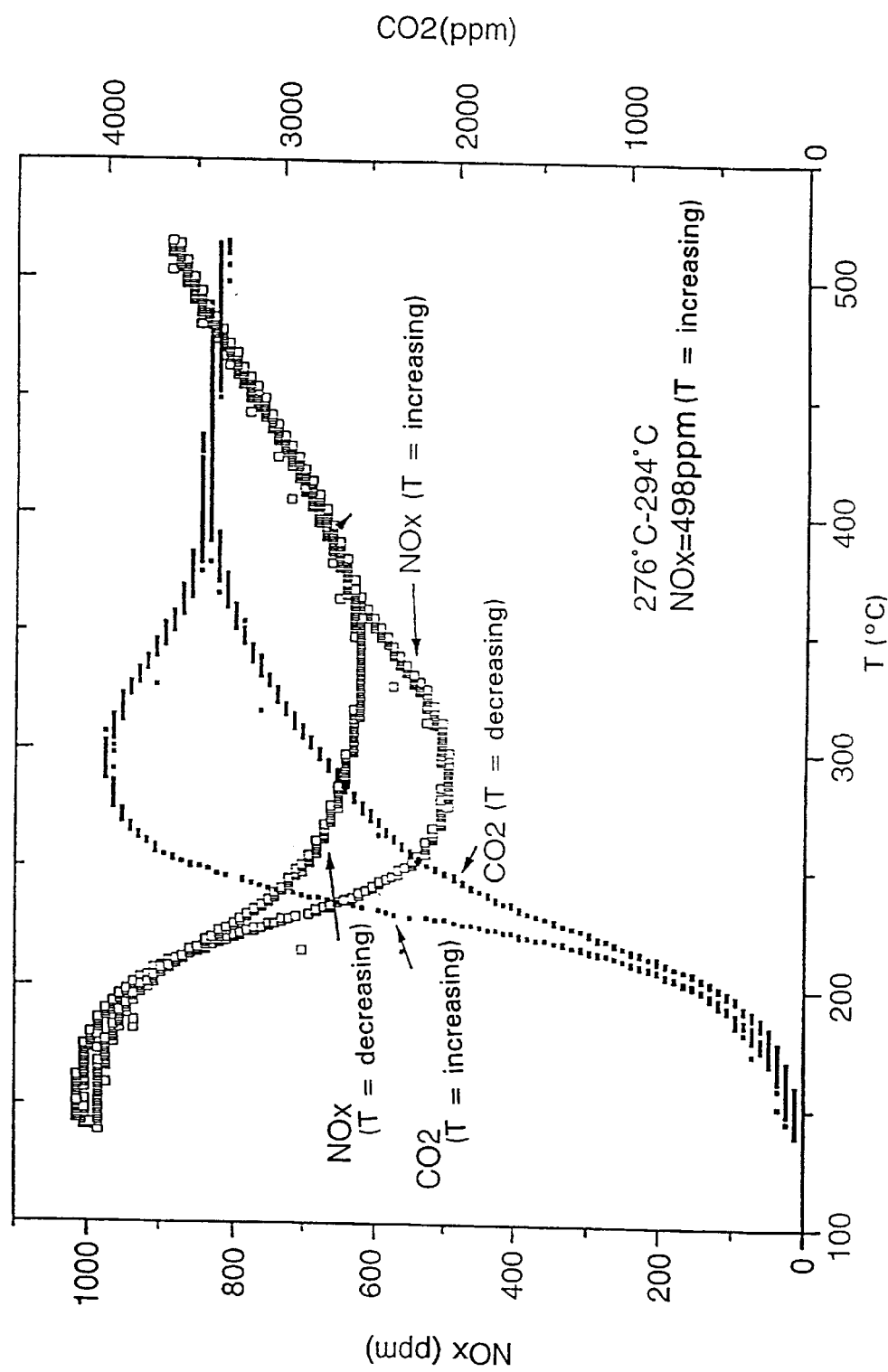
FIG. 4 is a graph of $NO_x/CO_2$ as a function of the temperature of a $CuAl_2O_4$ spinel.

A graph of the $NO_x/CO_2$ concentration as a function of the temperature obtained using a copper-impregnated $CuAl_2O_4$ spinel is shown in FIG. 4. The measurements were made with the temperature increasing as well as decreasing, wherein the conversion shows a hysteresis with respect to the CO and $NO_x$.

To carry out these measurements, a 10 gram sample of the copper-impregnated $CuAl_2O_4$ spinel was transferred to a vertically disposed quartz reactor having a diameter of 20 mm and a height of approximately 500 mm, in which a gas-permeable sintered glass disk was disposed in the middle to expose the sample. The height of the bed was about 15 mm. A furnace was disposed around the quartz reactor and heated the middle part of the reactor over a length of about 100 mm at temperatures of up to 550° C.

A gas mixture which consisted of 1,000 ppm NO, 1,000 ppm propene and 10% oxygen, with the remainder being argon as carrier gas, was passed through the catalyst at a space velocity of about 10000 per hour. After the gas mixture had passed through the reactor, the NO concentration was measured with a gas detector, in which any $NO_2$ formed was reduced in a converter to nitric oxide (NO) before the measurement. Simultaneously, oxidation of hydrocarbons to carbon dioxide was observed by measuring the carbon dioxide content with the gas detector.

The result of the measurements with the spinel is shown in the graph of FIG. 4. The NO and $CO_2$ concentrations are plotted in ppm as a function of the temperature, the $NO_x$ concentration and the $CO_2$ concentration being indicated differently with empty squares and solid rectangles respectively. The graph shows a clear decrease in the $NO_x$(NO) concentration as the temperature increases. This concentration reaches a minimum between about 276° C. and 294° C.

and subsequently rises again. For the copper-impregnated $CuAl_2O_4$, a drastic decrease in the $NO_x$ concentration was observed at a temperature above about 200° C., with the hydrocarbons being simultaneously decomposed to carbon dioxide, as is shown by the increase in the $CO_2$ concentration. The temperature range in which reduction of the $NO_x$ takes place lies between 200° C. and 400° C., depending on the composition of the material.

The temperature interval advantageously lies approximately at the temperatures which occur in the exhaust gas system of an internal combustion engine.

As this $CuAl_2O_4$ spinel has a good response behavior at relatively low temperatures, it is particularly suitable for use as an $NO_x$ exhaust gas catalyst for internal combustion engines and preferably for diesel engines.

Further testing of this catalyst additionally revealed high stability in the presence of $NO_x$, $H_2O$, and $CO_2$. Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of purifying a pollutant-containing exhaust gas comprising the steps of:

contacting an exhaust gas stream containing pollutants with a porous body which comprises a catalyst, passing the gas through the porous body, wherein a reducing agent is contained in the gas before the gas enters the catalyst, adding reducing agent to the filter body in liquid droplet form, wherein the droplets penetrate the filter body and completely vaporize within the filter body, thereby adding additional reducing agent to the gas in the porous body, and further passing the gas through the catalyst, said catalyst reducing the pollutants.

2. A method according to claim 1, wherein the catalyst is of the formula $A1_{a1}A2_{a2}B_bO_4$ wherein A1 and A2 independently represent at least one of Mg, Ca, Mn, Fe, Ni, Co, Cu, Zn, Sn and Ti, B is at least one of Al, Ga, In, Co, Fe, Cr, Mn, Cu, Zn, Sn, Ti and Ni, a1+a2+b=3 and a1, a2 and b are greater than 0.

3. The method according to claim 1, wherein a1 and a2 are 0.5 and b is 2.

4. The method of claim 1, wherein the reducing agent comprises a hydrocarbon.

5. The method of claim 1, wherein the reducing agent comprises ammonia.

6. The method of claim 1, wherein the pollutant-containing gas stream is exhaust gas of an internal combustion engine.

7. The method of claim 1, wherein the pollutant-containing gas stream is exhaust gas of a diesel engine or a gasoline engine operated with a lean mixture.

8. The method of claim 1, wherein the gas is purified by decreasing the concentration of at least one of nitrogen oxides, carbon monoxide and hydrocarbons in the exhaust gas stream.

9. The method of claim 8, wherein the nitrogen oxides are NO and $NO_2$.

10. The method of claim 1, wherein said further passing is at a temperature of 200–400° C.

11. The method of claim 1, wherein said further passing is at a temperature of about 200° C.

12. The method according to claim 1, wherein pollutants in the exhaust gas stream are nitrogen oxides.

* * * * *